(12) United States Patent
Brown et al.

(10) Patent No.: US 9,063,883 B2
(45) Date of Patent: Jun. 23, 2015

(54) MANAGEMENT OF POINT-IN-TIME COPY RELATIONSHIP FOR EXTENT SPACE EFFICIENT VOLUMES

(75) Inventors: Theresa M. Brown, Tucson, AZ (US); Ellen Joanne Grusy, Tucson, AZ (US); Lokesh M. Gupta, Tucson, AZ (US); Brian D. Hatfield, Tucson, AZ (US); Kurt A. Lovrien, Tucson, AZ (US); Carol S. Mellgren, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 605 days.

(21) Appl. No.: 13/245,502

(22) Filed: Sep. 26, 2011

(65) Prior Publication Data

US 2013/0080704 A1 Mar. 28, 2013

(51) Int. Cl.
| | | |
|---|---|---|
| *G06F 12/08* | (2006.01) | |
| *G06F 12/12* | (2006.01) | |
| *G06F 3/06* | (2006.01) | |
| *G06F 11/14* | (2006.01) | |

(52) U.S. Cl.
CPC .............. *G06F 12/12* (2013.01); *G06F 3/0608* (2013.01); *G06F 3/0644* (2013.01); *G06F 3/0665* (2013.01); *G06F 11/1458* (2013.01); *G06F 3/065* (2013.01)

(58) Field of Classification Search
CPC ..... G06F 12/12; G06F 3/0608; G06F 3/0644; G06F 3/0665; G06F 11/1458
See application file for complete search history.

(56) References Cited

U.S. PATENT DOCUMENTS

| | | | | |
|---|---|---|---|---|
| 6,611,901 | B1 * | 8/2003 | Micka et al. .................. | 711/162 |
| 7,293,137 | B2 * | 11/2007 | Factor et al. .................. | 711/113 |
| 7,603,532 | B2 * | 10/2009 | Rajan et al. ................... | 711/166 |
| 2003/0115432 | A1 * | 6/2003 | Biessener et al. ............. | 711/162 |

(Continued)

FOREIGN PATENT DOCUMENTS

EP  1 990 720  12/2008

OTHER PUBLICATIONS

U.S. Appl. No. 13/790,088, filed Mar. 8, 2013, entitled "Management of Point-In-Time Copy Relationship for Space Efficient Volumes", invented by T.M. Brown, et al., 29 pp. [18.399C1 (Appln)].

(Continued)

*Primary Examiner* — Matthew Bradley
*Assistant Examiner* — Ramon A Mercado
(74) *Attorney, Agent, or Firm* — Rabindranath Dutta; Konrad Raynes Davda & Victor LLP

(57) ABSTRACT

A storage controller receives a request to establish a point-in-time copy operation by placing a space efficient source volume in a point-in-time copy relationship with a space efficient target volume, wherein subsequent to being established the point-in-time copy operation is configurable to consistently copy the space efficient source volume to the space efficient target volume at a point in time. A determination is made as to whether any track of an extent is staging into a cache from the space efficient target volume or destaging from the cache to the space efficient target volume. In response to a determination that at least one track of the extent is staging into the cache from the space efficient target volume or destaging from the cache to the space efficient target volume, release of the extent from the space efficient target volume is avoided.

18 Claims, 8 Drawing Sheets

| | Status of extent in space efficient source Volume | Are tracks for the extent in flight from the cache to the space efficient target volume | Release extent from the space efficient target volume or not | Target bitmap marking for extent (i.e, tracks) |
|---|---|---|---|---|
| 604 | Allocated | In flight | Do not release extent | 1 (a target read will redirect to the source volume) |
| 606 | Unallocated | In flight | Do not release extent | 1 (a target read will redirect to the source volume) |
| 608 | Allocated | Not in flight | Release extent | 1 (a target read will redirect to the source volume) |
| 610 | Unallocated (does not exist in source volume) | Not in flight | Release extent | 0 (guarantees that a target extent will not get allocated) |

(56) References Cited

U.S. PATENT DOCUMENTS

| | | | |
|---|---|---|---|
| 2004/0186968 A1* | 9/2004 | Factor et al. | 711/162 |
| 2008/0120459 A1* | 5/2008 | Kaneda et al. | 711/112 |
| 2010/0082931 A1* | 4/2010 | Hatfield | 711/166 |
| 2010/0088468 A1* | 4/2010 | Agombar et al. | 711/112 |
| 2010/0169594 A1* | 7/2010 | Tsaur et al. | 711/162 |
| 2010/0250880 A1* | 9/2010 | Mimatsu | 711/162 |
| 2010/0250882 A1* | 9/2010 | Hutchison et al. | 711/162 |
| 2010/0299491 A1* | 11/2010 | Ueda | 711/162 |
| 2010/0325377 A1* | 12/2010 | Lango et al. | 711/162 |
| 2011/0016271 A1* | 1/2011 | Ash et al. | 711/113 |
| 2012/0254547 A1* | 10/2012 | Benhase et al. | 711/133 |

OTHER PUBLICATIONS

Preliminary Remarks for U.S. Appl. No. 13/790,088, dated Mar. 8, 2013, 2 pages. [18.399C1 (PrelimRemarks)].

C. Burger, et al., "IBM System Storage DS8000 Series: IBM FlashCopy SE", IBM Corporation, Document No. REDP-4368-00, Feb. 2008, pp. 1-80.

B. Dufrasne, et al., "DS8000 Thin Provisioning", IBM Corporation, Document No. REDP-4554-00, Oct. 2009, pp. 1-118.

Combined Search and Examination Report under Sections 17 and 18(3) dated Oct. 25, 2012 for Application No. GB11211748.7, pp. 5.

Response dated Jan. 8, 2013, pp. 1-8, to Combined Search and Examination Report under Sections 17 and 18(3) dated Oct. 25, 2012 for Application No. GB11211748.7, pp. 5.

Office Action Dated Feb. 5, 2014, pp. 19, for U.S. Appl. No. 13/790,088, filed Mar. 8, 2013.

Response dated May 5, 2014, pp. 10, to Office Action Dated Feb. 5, 2014, pp. 19, for U.S. Appl. No. 13/790,088, filed Mar. 8, 2013.

Final Office Action Dated 2014-08-29, pp. 17, for U.S. Appl. No. 13/790,088, filed Mar. 8, 2013.

Notice of Allowance dated Jan. 30, 2015, pp. 12, for U.S. Appl. No. 13/790,088, filed Mar. 8, 2013 (18.399C1).

\* cited by examiner

| Status of extent in space efficient source Volume | Are tracks for the extent in flight from the cache to the space efficient target volume | Release extent from the space efficient target volume or not | Target bitmap marking for extent (i.e, tracks) |
|---|---|---|---|
| Allocated | In flight | Do not release extent | 1 (a target read will redirect to the source volume) |
| Unallocated | In flight | Do not release extent | 1 (a target read will redirect to the source volume) |
| Allocated | Not in flight | Release extent | 1 (a target read will redirect to the source volume) |
| Unallocated (does not exist in source volume) | Not in flight | Release extent | 0 (guarantees that a target extent will not get allocated) |

FIG. 6

MANAGEMENT OF POINT-IN-TIME COPY RELATIONSHIP FOR EXTENT SPACE EFFICIENT VOLUMES

BACKGROUND

1. Field

The disclosure relates to a method, system, and article of manufacture for the management of point-in-time copy relationship for space efficient volumes.

2. Background

A storage controller may control a plurality of storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively smaller in comparison to the storage capacity of certain other storage devices, such as, hard disks, tapes, etc., that are controlled by the storage controller.

The storage controller may perform point-in-time copy operations to copy source storage volumes to target storage volumes, where a point-in-time copy is a fully usable copy of a defined collection of data that contains an image of the data as it appeared at a single point in time. The copy is considered to have logically occurred at that point in time and the data in the target storage volumes is a consistent copy of the data as it appeared at that point in time in the source storage volumes. FlashCopy* is a point-in-time copy mechanism implemented by International Business Machines Corporation.

*FlashCopy is a trademark or registered trademark of International Business Machines Corporation.

A space efficient volume is a type of storage volume that does not occupy physical capacity when it is created. Space gets allocated when data is actually written to the space efficient volume. In other words, space for a space efficient volume is allocated when a write occurs, and more precisely, when a destage from the cache occurs and there is no allocated space designated for the write on the currently allocated extent or track.

SUMMARY OF THE PREFERRED EMBODIMENTS

Provided are a method, a system, and a computer program product in which a storage controller receives a request to establish a point-in-time copy operation by placing a space efficient source volume in a point-in-time copy relationship with a space efficient target volume, wherein subsequent to being established the point-in-time copy operation is configurable to consistently copy the space efficient source volume to the space efficient target volume at a point in time. A determination is made as to whether any track of an extent is staging into a cache from the space efficient target volume or destaging from the cache to the space efficient target volume. In response to a determination that at least one track of the extent is staging into the cache from the space efficient target volume or destaging from the cache to the space efficient target volume, release of the extent from the space efficient target volume is avoided.

In additional embodiments, a determination is made as to whether any track of the extent is awaiting staging into the cache from the space efficient target volume or awaiting destaging from the cache to the space efficient target volume. An avoidance is made of releasing the extent from the space efficient target volume, in response to determining that at least one track of the extent is awaiting staging into the cache from the space efficient target volume or awaiting destaging from the cache to the space efficient target volume.

In yet additional embodiments, the extent is released from the space efficient target volume in response to determining that no track of the extent is staging or awaiting staging into the cache from the space efficient target volume, and no track of the extent is destaging or awaiting destaging from the cache to the space efficient target volume.

In further embodiments, in response to determining that the extent is allocated in the space efficient source volume and that at least one track of the extent is staging or awaiting staging into the cache from the space efficient target volume, or is destaging or awaiting destaging from the cache to the space efficient target volume, an indicator is set in a target bitmap corresponding to the extent to indicate that a read for the extent from the space efficient target volume is to be redirected to the space efficient source volume.

In yet further embodiments, in response to determining that the extent is unallocated in the space efficient source volume, and that at least one track of the extent is staging or awaiting staging into the cache from the space efficient target volume, or is destaging or awaiting destaging from the cache to the space efficient target volume, an indicator is set in a target bitmap corresponding to the extent to indicate that any read for the extent from the space efficient target volume is to be redirected to the space efficient source volume. Additionally, in response to determining that the extent is unallocated in the space efficient source volume, and that no track of the extent is staging or awaiting staging into the cache from the space efficient target volume, and no track of the extent is destaging or awaiting destaging from the cache to the space efficient target volume, the indicator in the target bitmap corresponding to the extent is set to indicate that any read for the extent from the space efficient target volume is not to be redirected to the space efficient source volume. Furthermore, in response to determining that the extent is allocated in the space efficient source volume, and that no track of the extent is staging or awaiting staging into the cache from the space efficient target volume, and no track of the extent is destaging or awaiting destaging from the cache to the space efficient target volume, the indicator is set in a target bitmap corresponding to the extent to indicate that a read for the extent from the space efficient target volume is to be redirected to the space efficient source volume.

In additional embodiments, an extent exception table maintains indications as to which extents of the space efficient target volume are staging or awaiting to be staged into the cache, or destaging or awaiting to be destaged from the cache, to establish the point-in-time copy operation in a smaller amount of time in comparison to not maintaining the indications as to which extents of the space efficient target volume are staging or awaiting to be staged into the cache, or destaging or awaiting to be destaged from the cache.

In yet additional embodiments, host Input/Output (I/O) to the space efficient source volume is initiated prior to completing operations to release volume space to the space efficient target volume, wherein new customer data is held in the cache until the operations to release volume space to the space efficient target volume are completed.

In certain embodiments, in response to the storage controller being interrupted between the point-in-time copy operation being established and completion of releasing of space for the space efficient target volume, operations are executed to release volume space once again prior to any new customer data being allowed to be written onto the space efficient target volume.

BRIEF DESCRIPTION OF THE DRAWINGS

Referring now to the drawings in which like reference numbers represent corresponding parts throughout:

FIG. 6 illustrates a block diagram that shows a table that indicates the conditions under which an extent is released or not released from a target volume, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Point-In-Time Copy with Space Efficient Volumes

When a standard storage volume (i.e., a storage volume that is not space efficient) is created, it occupies the defined storage capacity on the physical drives. A space efficient storage volume does not occupy physical capacity when it is initially created. Space gets allocated when data is actually written to the space efficient storage volume.

Space efficient storage volumes can be created by a storage controller when point-in-time copy operations are used. The point-in-time target storage volume capacity may be thinly provisioned, i.e., the target volume capacity is smaller than the full capacity of the source volume. Therefore, when planning for point-in-time copy with space efficient storage volumes, an administrator can initially provision less disk capacity, which can help lower the amount of physical storage that is needed by many installations. Without the use of space efficient storage volumes, target storage volumes consume the same physical capacity as source storage volumes during point-in-time copy.

Considerations for support for space efficient storage volumes in point-in-time copy include the amount of time the source storage volume is quiesced (i.e., restricted) from host input/output (I/O) operations and the amount of time it takes to establish a point-in-time copy relationship comparable to standard volumes. Certain embodiments provide mechanisms that support space efficient volumes in point-in-time copy operations without causing a significant performance penalty, by allowing release of extents that are not in flight between a cache and a space efficient target volume, and avoiding release of extents that are in flight between the cache and the space efficient target volume.

Exemplary Embodiments

Figure 1:
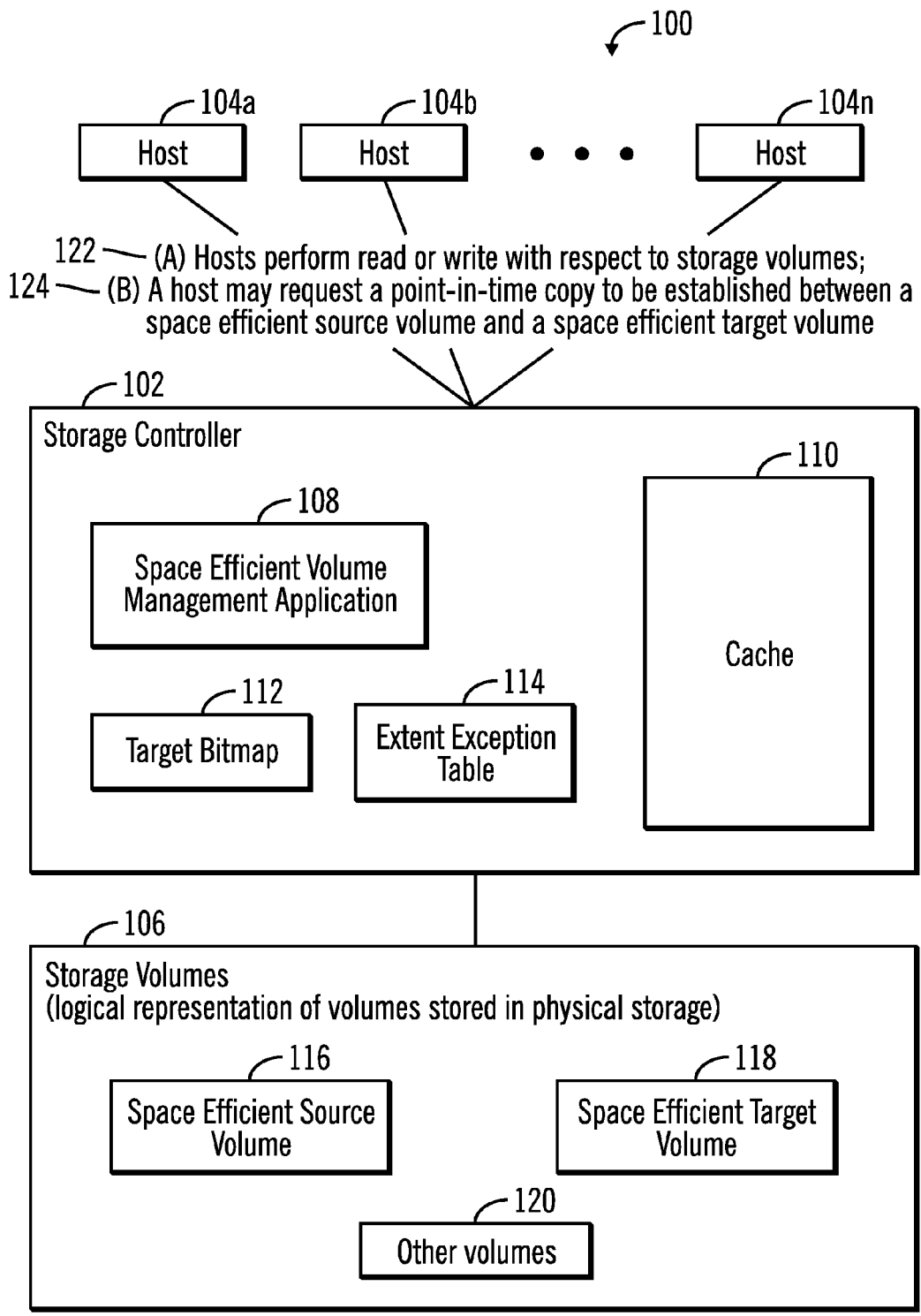
FIG. 1 illustrates a block diagram of a computing environment that includes a storage controller coupled to a plurality of hosts and controlling a plurality of storage volumes, in accordance with certain embodiments.

FIG. 1 illustrates a block diagram of a computing environment 100 that includes a storage controller 102 coupled to a plurality of hosts 104a, 104b, . . . , 104n. The storage controller 102 controls a plurality of storage volumes 106 that are logical representations of volumes stored in physical storage coupled to the storage controller 102.

The storage controller 102 and the hosts 104a . . . 104n may comprise any suitable computational device including those presently known in the art, such as, a personal computer, a workstation, a server, a mainframe, a hand held computer, a palm top computer, a telephony device, a network appliance, a blade computer, a server, etc. The storage volume 106 may comprise logical representations of volumes stored in one or more suitable physical storage devices, such as hard disks, solid state disks, floppy disks, etc.

The storage controller 102, the hosts 104a . . . 104n, and physical storage coupled to the storage controller communicate over a network, such as the Internet, a storage area network, a wide area network, a local area network, etc. In certain embodiments, the storage controller 102 may provide computing, software, and storage services to the hosts 104a . . . 104n in a cloud computing environment.

The storage controller 102 executes a space efficient volume management application 108 and controls a cache 110 that is shown within the storage controller 102. In alternative embodiments, the cache 110 may be present outside the storage controller 102. Additionally, the storage controller 102 maintains data structures referred to as a target bitmap 112 and an extent exception table 114. The space efficient volume management application 108 manages a plurality of space efficient volumes included in the storage volumes 106. For example, the space efficient volume management application 108 may control the space efficient source volume 116 and the space efficient target volume 118. The storage volumes 106 may include other volumes 120 besides the space efficient source volume 116 and the space efficient target volume 118, where the other volumes 120 may be space efficient volumes or standard volumes.

The hosts 104a . . . 104n may perform read or write operations with respect to one or more storage volumes 106. For example, host 104a may read from or write to the space efficient source volume 116 (reference numeral 122). A host may also request a point-in-time copy to be established between a space efficient source volume 116 and a space efficient target volume 118 (reference numeral 124).

Figure 2:
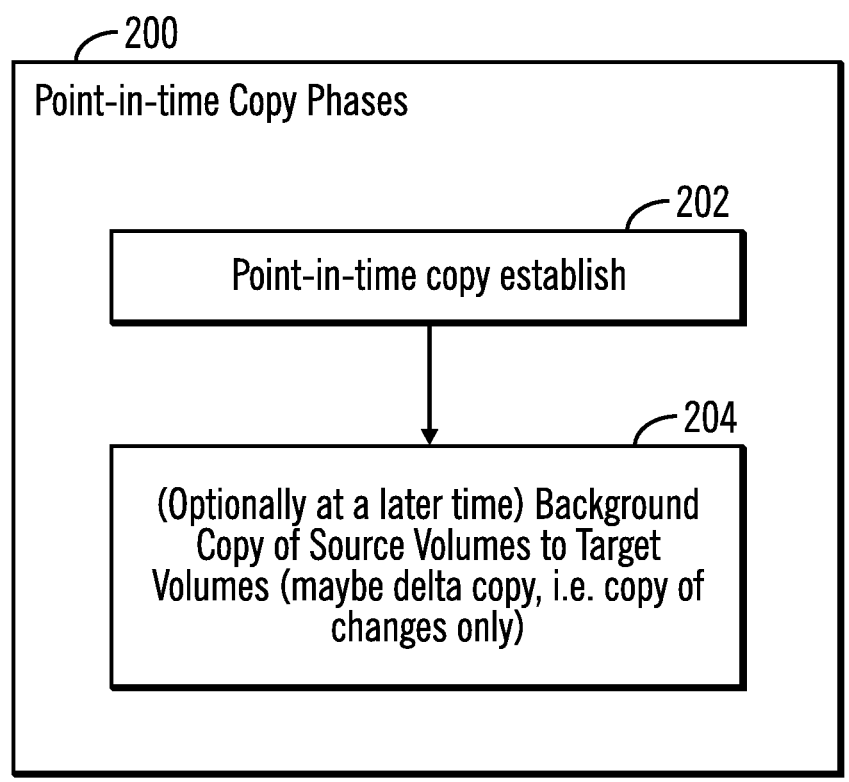
FIG. 2 illustrates a block diagram that shows the phases for point-in-time-copy, in accordance with certain embodiments.

FIG. 2 illustrates a block diagram that shows the phases for point-in-time-copy 200, in accordance with certain embodiments. In a first phase, a point-in-time copy establish (reference numeral 202) is performed, and optionally in a second phase background copy operations that copy source volumes to target volumes may be performed, wherein the copy operations performed in the background may generate delta copies, i.e., copies of changes to files rather than copies of entire files.

Figure 3:
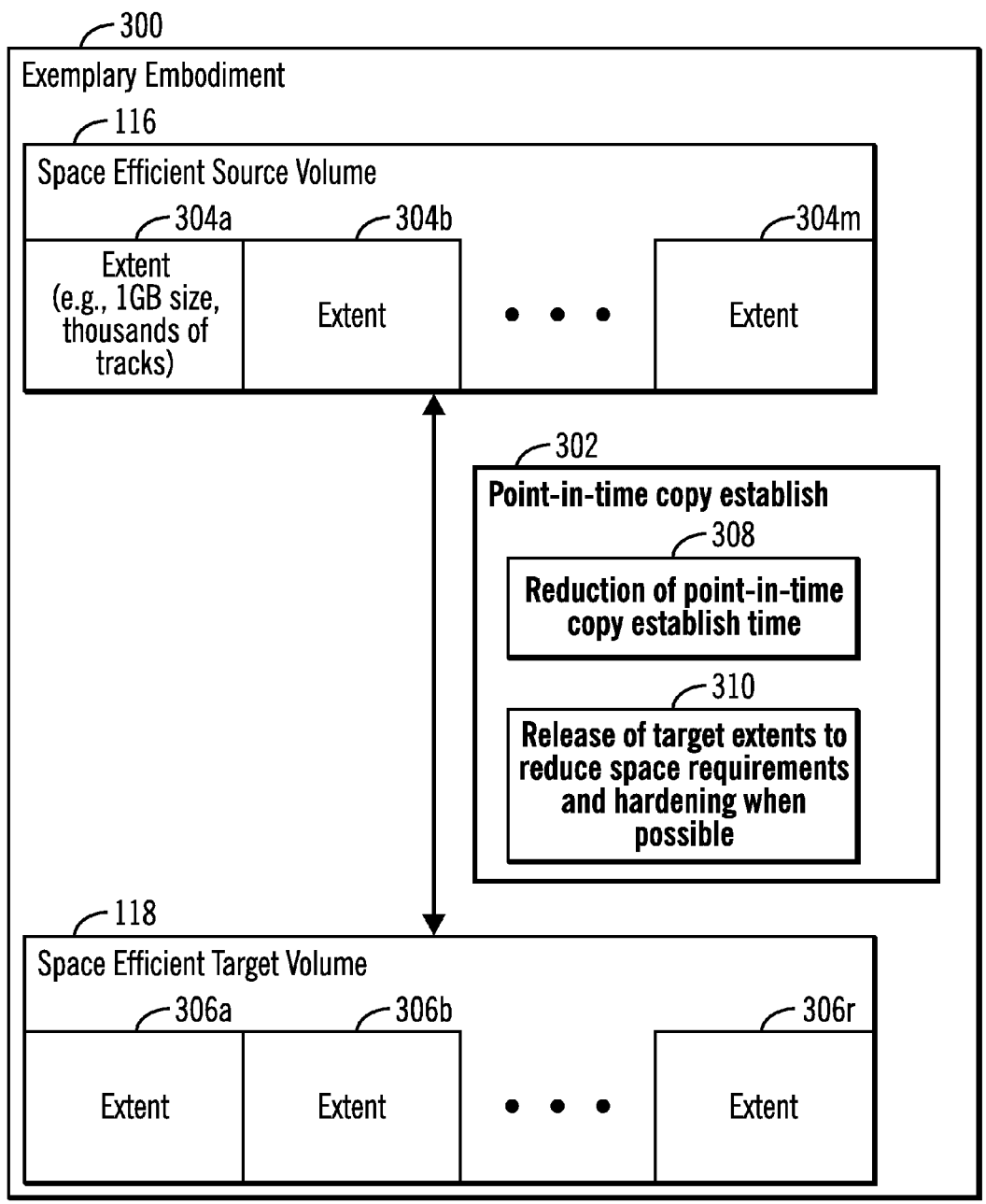
FIG. 3 illustrates a block diagram that shows point-in-time copy establish being performed with respect to a space efficient source volume and a space efficient target volume, in accordance with certain embodiments.

FIG. 3 illustrates a block diagram of an exemplary embodiment 300 that shows point-in-time copy establish 302 being performed with respect to a space efficient source volume 116 and a space efficient target volume 118, in accordance with certain embodiments. The space efficient source volume 116 and the space efficient target volume 118 may be controlled by the storage controller 102.

Each space efficient volume is comprised of a plurality of extents, where an extent is a unit of storage. For example, in certain embodiments each extent may be 1 GB is size and may include thousands of tracks. In FIG. 3, the space efficient source volume 116 is comprised of a plurality of extents 304a, 304b, . . . 304m, and the space efficient target volume 118 is comprised of a plurality of extents 306a, 306b, . . . 306r.

In certain embodiments, the space efficient volume management application 108 that executes in the storage controller 102 controls the execution of the point-in-time copy establish 302, such that there is a reduction the processing time of the point-in-time establish (reference numeral 308) for space efficient volumes. Storage space utilization is improved (reference numeral 310) by the space efficient volume management application 108 by release of target space efficient volume extents and hardening of data when possible.

Figure 4:
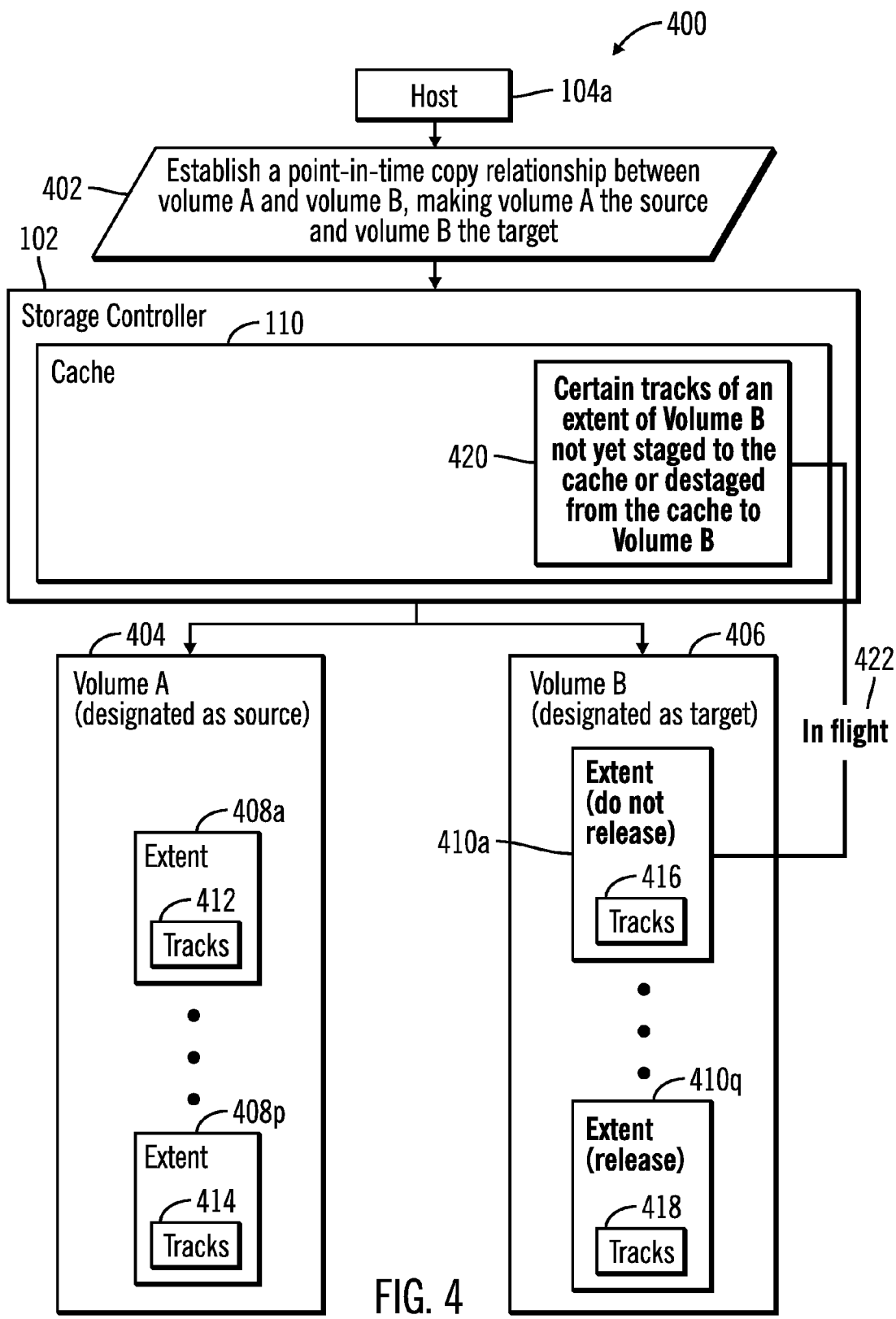
FIG. 4 illustrates a block diagram that shows how certain tracks may be in flight during a point-in-time establish, in accordance with certain embodiments.

FIG. 4 illustrates a block diagram 400 that shows how certain tracks may be in flight after a point-in-time copy establish operation has been initiated (reference numeral 402) between an exemplary volume A 404 and an exemplary volume B 406 by an exemplary host 104a, in accordance with certain embodiments.

In FIG. 4, volume A 404 is designated as the source volume and volume B 406 is designated as the target volume for point-in-time copy operations. Volume A 404 is comprised of a plurality of extents 408a . . . 408p, and volume B 406 is comprised of a plurality of extents 410a . . . 410q. Each extent in volume A 406 and volume B 406 may have tracks, where exemplary tracks 412, 414, 416, 418 are shown in FIG. 4.

In response to receiving the establish point-in-time 402 from the host 104a, the space efficient volume management application 108 may determine that certain tracks of the extent 410a of the designated target volume B 406 have not yet been staged (i.e., the tracks are undergoing staging or awaiting staging) to the cache 110 from volume B 406, or have not yet been destaged (i.e., the tracks are undergoing destaging or awaiting destaging) from the cache 110 to volume B 406 (reference numeral 420). The extent 410a is indicated as being "in flight" (reference numeral 422) because at least certain tracks of the extent 410a are undergoing staging or awaiting staging to the cache 110 from volume B 406, or because at least certain tracks of the extent 410a are undergoing destaging or awaiting destaging from the cache 110 to volume B 406.

In certain embodiments, the space efficient volume management application 108 processes extents that are in flight in a different manner than extents that are not in flight, in response to a point-in-time establish. Extents that are in flight are not released, whereas extents that are not in flight may be released.

Since extents that are not in flight may be released from the target volume B 406, management of the space efficient volume is efficient and storage space requirements are reduced. However, certain extents that are in flight may not be released from the target volume B 406 until the extents are no longer in flight. The space efficient volume management application 108 manages which extents may be released and which extents may not be released.

Figure 5:
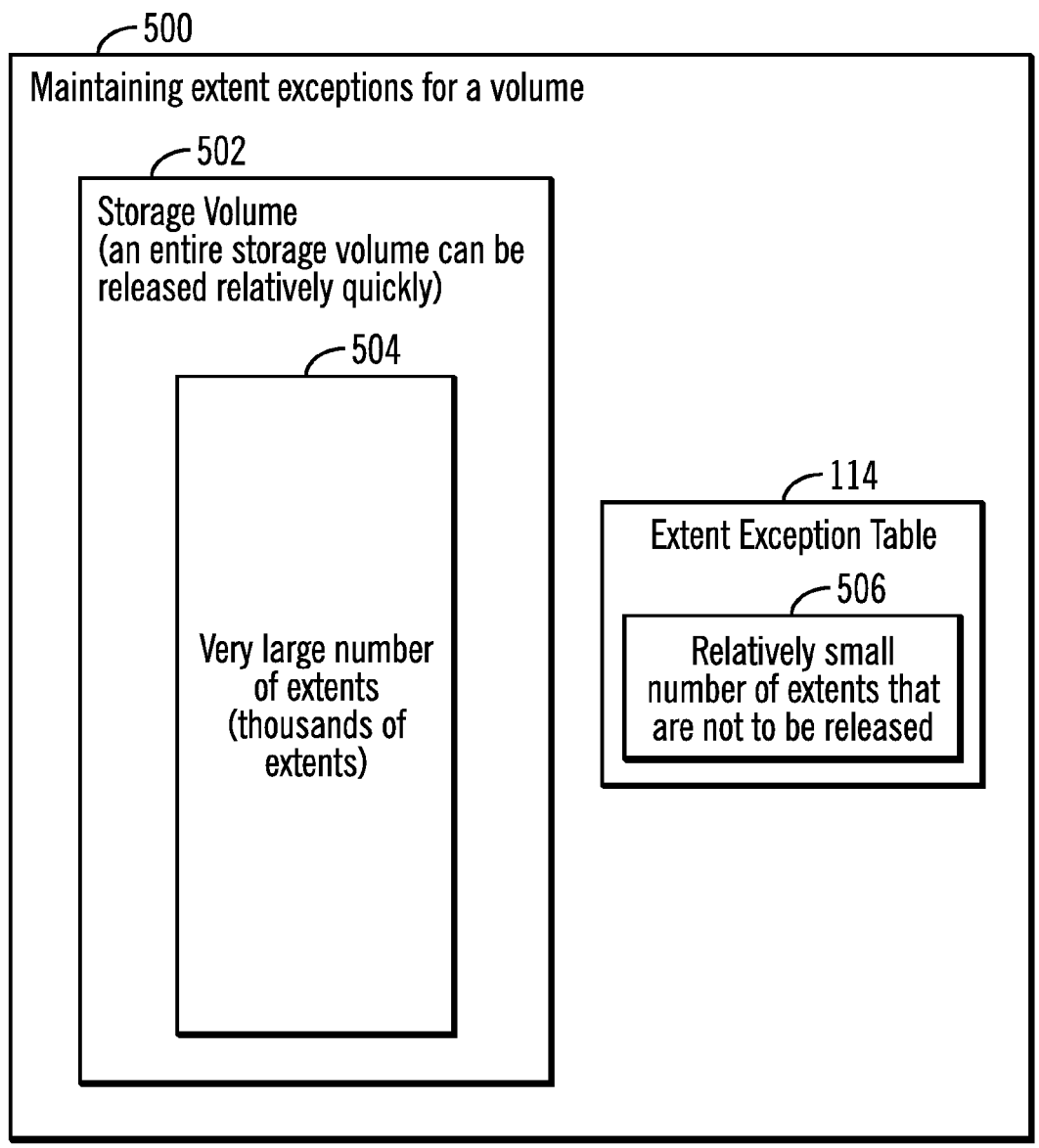
FIG. 5 illustrates a block diagram that shows how extent exceptions are maintained for a volume, in accordance with certain embodiments.

FIG. 5 illustrates a block diagram 500 that shows how extent exceptions are maintained for a volume, in accordance with certain embodiments. A storage volume 502 may comprise a very large number (e.g., thousands) of extents 504. However, only a relatively small number of extents may be in flight and these relatively small number of extents 506 are indicated in an extent exception table 114 that is maintained by the space efficient volume management application 108 in the storage controller 102.

Therefore, in certain embodiments shown in FIG. 5, the extent exception table 114 maintains indications 506 as to which extents of the space efficient target volume are staging or awaiting to be staged into the cache, or destaging or awaiting to be destaged from the cache, to establish a point-in-time copy operation in a smaller amount of time in comparison to not maintaining the indications as to which extents of the space efficient target volume are staging or awaiting to be staged into the cache, or destaging or awaiting to be destaged from the cache.

FIG. 6 illustrates a block diagram 600 that shows in a table 602 the conditions under which an extent is released or not released from a target volume, such as space efficient target volume 118, in accordance with certain embodiments.

In table 602, the entries of row 604 indicate that in response to determining that an extent is allocated in the space efficient source volume 116 and that at least one track of the extent is staging or awaiting staging into the cache 110 from the space efficient target volume 118, or is destaging or awaiting destaging from the cache 110 to the space efficient target volume 118 (i.e., the extent is in flight), an indicator is set in a target bitmap corresponding to the extent to indicate that a read for the extent from the space efficient target volume is to be redirected to the space efficient source volume.

In table 602, the entries of row 606 indicate that in response to determining that the extent is unallocated in the space efficient source volume 116, and that at least one track of the extent is staging or awaiting staging into the cache 110 from the space efficient target volume 118, or is destaging or awaiting destaging from the cache 110 to the space efficient target volume 118, an indicator is set in a target bitmap corresponding to the extent to indicate that any read for the extent from the space efficient target volume is to be redirected to the space efficient source volume.

Additionally, in table 602, the entries of row 610 indicate that in response to determining that the extent is unallocated in the space efficient source volume, and that no track of the extent is staging or awaiting staging into the cache 110 from the space efficient target volume 118, and no track of the extent is destaging or awaiting destaging from the cache 110 to the space efficient target volume 118, the indicator in the target bitmap corresponding to the extent is set to indicate that any read for the extent from the space efficient target volume is not to be redirected to the space efficient source volume.

Furthermore, in table 602, the entries of row 608 indicate that in response to determining that the extent is allocated in the space efficient source volume, and that no track of the extent is staging or awaiting staging into the cache 110 from the space efficient target volume 118, and no track of the extent is destaging or awaiting destaging from the cache 110 to the space efficient target volume 118, the indicator is set in a target bitmap corresponding to the extent to indicate that a read for the extent from the space efficient target volume is to be redirected to the space efficient source volume.

Therefore, FIG. 6 shows how the space efficient volume management application 108 manages space efficient volumes while allowing the execution of point-in-time copy from a space efficient source volume 116 to a space efficient target volume 118. The target bitmap marking for an extent (shown in FIG. 6 via reference numeral 612) is stored in a data structure of the storage controller 102, where the data structure is referred to as the target bitmap 112 in FIG. 1.

Figure 7:
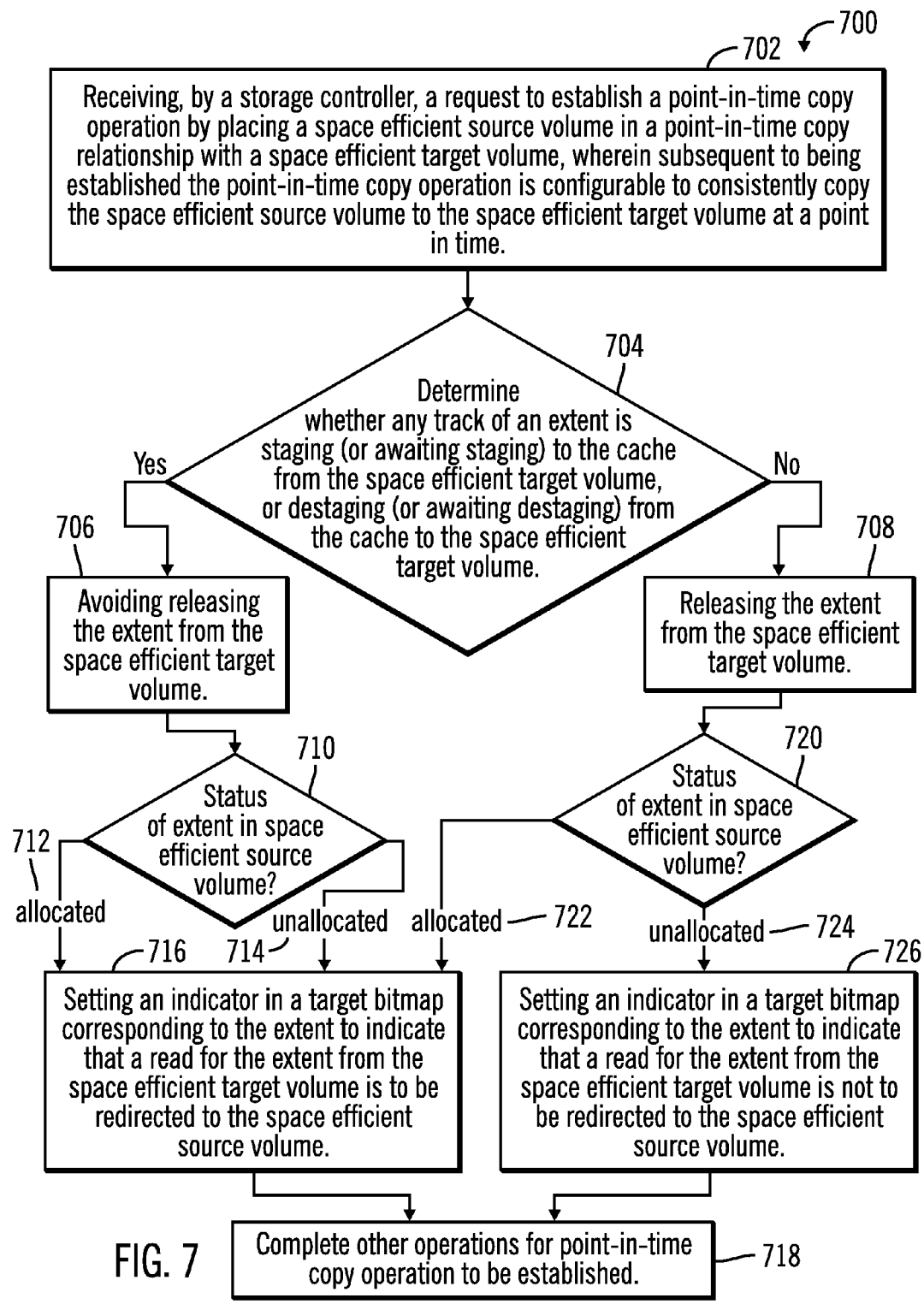
FIG. 7 illustrates a flowchart that shows certain operations, in accordance with certain embodiments.

FIG. 7 illustrates a flowchart that shows certain operations, in accordance with certain embodiments. The operations shown in FIG. 7 may be performed by the space efficient volume management application 108 that executes in the storage controller 102.

Controls starts at block 702 in which, a storage controller 102 receives a request to establish a point-in-time copy operation by placing a space efficient source volume 116 in a point-in-time copy relationship with a space efficient target volume 118, wherein subsequent to being established the point-in-time copy operation is configurable to consistently copy the space efficient source volume to the space efficient target volume at a point in time.

Control proceeds to block 704, in which the space efficient volume management application 108 determines whether any track of an extent of the space efficient target volume 118 is staging (or awaiting staging) to the cache 110, or destaging (or awaiting destaging) from the cache 110 to the space efficient target volume 118. If so, control proceeds to block 706 in which the space efficient volume management application 108 avoids releasing the extent from the space efficient target volume 118. If not, control proceeds to block 708 in which the space efficient volume management application 108 releases the extent from the space efficient target volume 118.

From block 706 control proceeds to block 710 in which the space efficient volume management application 108 determines the status of the extent in the space efficient source volume 116. Irrespective of whether the extent is allocated 712 or unallocated 714 in the space efficient source volume 116, the space efficient volume management application 108 sets (at block 716) an indicator in a target bitmap 112 corresponding to the extent to indicate that a read for the extent from the space efficient target volume 118 is to be redirected to the space efficient source volume 116. Subsequently, the space efficient volume management application 108 completes (at block 718) other operations for establishing the point-in-time copy.

From block 708 control proceeds to block 720 in which the space efficient volume management application 108 determines the status of the extent in the space efficient source volume 116. If the status of the extent is determined to be allocated 722 in the space efficient source volume 116 control proceeds to block 716 in which the space efficient volume management application 108 sets (at block 716) an indicator in a target bitmap 112 corresponding to the extent to indicate that a read for the extent from the space efficient target volume 118 is to be redirected to the space efficient source volume 116.

If at block 720, the status of the extent is determined to be unallocated 724 control proceeds to block 726 in which the space efficient volume management application 108 sets an indicator in a target bitmap 112 corresponding to the extent to indicate that a read for the extent from the space efficient target volume 118 is not to be redirected to the space efficient source volume 116, and control proceeds to block 718 for completion of other operations for point-in-time copy to be established.

In certain embodiments, host Input/Output (I/O) to the space efficient source volume 116 is initiated prior to completing operations to release volume space to the space efficient target volume 118, wherein new customer data is held in the cache 110 until the operations to release volume space to the space efficient target volume 118 are completed.

In certain embodiments, in response to the storage controller 102 being interrupted between the point-in-time copy operation being established and completion of release of space for the space efficient target volume 118, operations are executed to release volume space once again prior to any new customer data being allowed to be written onto the space efficient target volume.

Therefore, FIGS. 1-7 illustrate certain embodiments in which space efficient storage volumes are used as source and target for a point-in-time copy. Certain embodiments retain the space efficiency of space efficient storage volume over standard volumes by releasing extents that are not in flight between a space efficient target volume and a cache. Under certain conditions, reads to extents from the space efficient target volume may be redirected to the space efficient source volume. As a result, the space efficiency of space efficient volumes is maintained while permitting point-in-time copy with space efficient source volumes as source and target.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
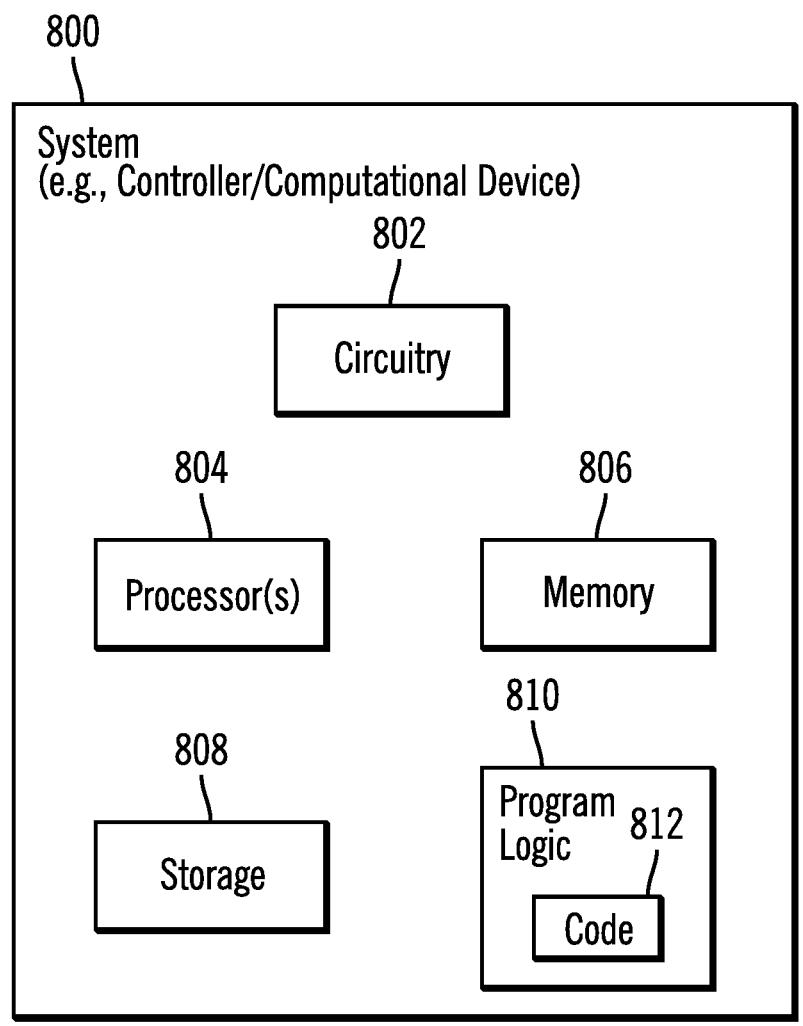
FIG. 8 illustrates a block diagram of a computational system that shows certain elements that may be included in the storage controller of FIG. 1, in accordance with certain embodiments.

FIG. 8 illustrates a block diagram that shows certain elements that may be included in the storage controller 102 or the hosts 104a ... 104n, in accordance with certain embodiments. The system 800 may comprise the storage controller 102 or the hosts 104a ... 104n, and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A storage controller, comprising:
   a memory; and
   a processor coupled to the memory, wherein the process performs operations, the operations comprising:
     receiving a request to establish a point-in-time copy operation by placing a space efficient source volume in a point-in-time copy relationship with a space efficient target volume, wherein subsequent to being established the point-in-time copy operation is configurable to consistently copy the space efficient source volume to the space efficient target volume at a point in time; and maintaining, in an extent exception table within the storage controller, indications of which extents of the space efficient target volume are in flight, wherein extents are in flight if tracks of the extents are staging or awaiting to be staged into a cache from the space efficient target volume, or destaging or awaiting to be destaged from the cache to the space efficient target volume, and wherein:
       if an extent is allocated in the space efficient source volume, and the extent is in flight, then the extent is not released from the space efficient target volume;
       if the extent is unallocated in the space efficient source volume, and the extent is in flight, then the extent is not released from the space efficient target volume;
       if the extent is allocated in the space efficient source volume, and the extent is not in flight, then the extent is released from the space efficient target volume; and
       if the extent is unallocated in the space efficient source volume, and the extent is not in flight, then the extent is released from the space efficient target volume.

2. The storage controller of claim 1, the operations further comprising:
   determining whether any track of the extent is awaiting staging into the cache from the space efficient target volume or awaiting destaging from the cache to the space efficient target volume; and
   avoiding releasing the extent from the space efficient target volume, in response to determining that at least one track of the extent is awaiting staging into the cache from the space efficient target volume or awaiting destaging from the cache to the space efficient target volume.

3. The storage controller of claim 2, the operations further comprising:
   releasing the extent from the space efficient target volume in response to determining that no track of the extent is staging or awaiting staging into the cache from the space efficient target volume, and no track of the extent is destaging or awaiting destaging from the cache to the space efficient target volume.

4. The storage controller of claim 3, the operations further comprising:
   in response to determining that the extent is allocated in the space efficient source volume and that at least one track of the extent is staging or awaiting staging into the cache from the space efficient target volume, or is destaging or awaiting destaging from the cache to the space efficient target volume, performing:
     setting an indicator in a target bitmap corresponding to the extent to indicate that a read for the extent from the space efficient target volume is to be redirected to the space efficient source volume.

5. The storage controller of claim 3, the operations further comprising:
   in response to determining that the extent is unallocated in the space efficient source volume, and that at least one track of the extent is staging or awaiting staging into the cache from the space efficient target volume, or is destaging or awaiting destaging from the cache to the space efficient target volume, performing: setting an indicator in a target bitmap corresponding to the extent to indicate that any read for the extent from the space efficient target volume is to be redirected to the space efficient source volume;
   in response to determining that the extent is unallocated in the space efficient source volume, and that no track of the extent is staging or awaiting staging into the cache from the space efficient target volume, and no track of the extent is destaging or awaiting destaging from the cache to the space efficient target volume, performing: setting the indicator in the target bitmap corresponding to the extent to indicate that any read for the extent from the space efficient target volume is not to be redirected to the space efficient source volume; and
   in response to determining that the extent is allocated in the space efficient source volume, and that no track of the extent is staging or awaiting staging into the cache from the space efficient target volume, and no track of the extent is destaging or awaiting destaging from the cache to the space efficient target volume, performing: setting the indicator in a target bitmap corresponding to the extent to indicate that a read for the extent from the space efficient target volume is to be redirected to the space efficient source volume.

6. The storage controller of claim 1, wherein:
   host Input/Output (I/O) to the space efficient source volume is initiated prior to completing operations to release volume space to the space efficient target volume, wherein new customer data is held in the cache until the operations to release volume space to the space efficient target volume are completed; and
   in response to the storage controller being interrupted between the point-in-time copy operation being established and completion of releasing space for the space efficient target volume, executing operations to release volume space once again prior to any new customer data being allowed to be written onto the space efficient target volume.

7. A computer program product, the computer program product comprising:
   a computer readable storage medium having computer readable program code embodied therewith, wherein the computer readable program code is configured to perform operations at a storage controller, the operations comprising:
     receiving a request to establish a point-in-time copy operation by placing a space efficient source volume in a point-in-time copy relationship with a space efficient target volume, wherein subsequent to being established the point-in-time copy operation is configurable to consistently copy the space efficient source volume to the space efficient target volume at a point in time; and maintaining, in an extent exception table within the storage controller, indications of which extents of the space efficient target volume are in flight, wherein extents are in flight if tracks of the extents are staging or awaiting to be staged into a cache from the space efficient target volume, or destaging or awaiting to be destaged from the cache to the space efficient target volume, and wherein:

if an extent is allocated in the space efficient source volume, and the extent is in flight, then the extent is not released from the space efficient target volume;

if the extent is unallocated in the space efficient source volume, and the extent is in flight, then the extent is not released from the space efficient target volume;

if the extent is allocated in the space efficient source volume, and the extent is not in flight, then the extent is released from the space efficient target volume; and if the extent is unallocated in the space efficient source volume, and the extent is not in flight, then the extent is released from the space efficient target volume.

8. The computer program product of claim 7, the operations further comprising:

determining whether any track of the extent is awaiting staging into the cache from the space efficient target volume or awaiting destaging from the cache to the space efficient target volume; and avoiding releasing the extent from the space efficient target volume, in response to determining that at least one track of the extent is awaiting staging into the cache from the space efficient target volume or awaiting destaging from the cache to the space efficient target volume.

9. The computer program product of claim 8, the operations further comprising:

releasing the extent from the space efficient target volume in response to determining that no track of the extent is staging or awaiting staging into the cache from the space efficient target volume, and no track of the extent is destaging or awaiting destaging from the cache to the space efficient target volume.

10. The computer program product of claim 9, the operations further comprising:

in response to determining that the extent is allocated in the space efficient source volume and that at least one track of the extent is staging or awaiting staging into the cache from the space efficient target volume, or is destaging or awaiting destaging from the cache to the space efficient target volume, performing:

setting an indicator in a target bitmap corresponding to the extent to indicate that a read for the extent from the space efficient target volume is to be redirected to the space efficient source volume.

11. The computer program product of claim 9, the operations further comprising:

in response to determining that the extent is unallocated in the space efficient source volume, and that at least one track of the extent is staging or awaiting staging into the cache from the space efficient target volume, or is destaging or awaiting destaging from the cache to the space efficient target volume, performing: setting an indicator in a target bitmap corresponding to the extent to indicate that any read for the extent from the space efficient target volume is to be redirected to the space efficient source volume;

in response to determining that the extent is unallocated in the space efficient source volume, and that no track of the extent is staging or awaiting staging into the cache from the space efficient target volume, and no track of the extent is destaging or awaiting destaging from the cache to the space efficient target volume, performing: setting the indicator in the target bitmap corresponding to the extent to indicate that any read for the extent from the space efficient target volume is not to be redirected to the space efficient source volume; and in response to determining that the extent is allocated in the space efficient source volume, and that no track of the extent is staging or awaiting staging into the cache from the space efficient target volume, and no track of the extent is destaging or awaiting destaging from the cache to the space efficient target volume, performing: setting the indicator in a target bitmap corresponding to the extent to indicate that a read for the extent from the space efficient target volume is to be redirected to the space efficient source volume.

12. The computer program product of claim 7, wherein:

host Input/Output (I/O) to the space efficient source volume is initiated prior to completing operations to release volume space to the space efficient target volume, wherein new customer data is held in the cache until the operations to release volume space to the space efficient target volume are completed; and in response to the storage controller being interrupted between the point-in-time copy operation being established and completion of releasing space for the space efficient target volume, executing operations to release volume space once again prior to any new customer data being allowed to be written onto the space efficient target volume.

13. The storage controller of claim 1, the operations further comprising:

maintaining a target bitmap corresponding to the extent within the storage controller; and in response to determining that the extent is unallocated in the space efficient source volume, and that no track of the extent is staging into the cache from the space efficient target volume, and that no track of the extent is awaiting staging into the cache from the space efficient target volume, and that no track of the extent is destaging from the cache to the space efficient target volume, and that no track of the extent is awaiting destaging from the cache to the space efficient target volume performing:

setting the indicator in the target bitmap corresponding to the extent to indicate that any read for the extent from the space efficient target volume is not to be redirected to the space efficient source volume.

14. The storage controller of claim 1, the operations further comprising:

determining whether any track of the extent is awaiting staging into the cache from the space efficient target; and avoiding releasing the extent from the space efficient target volume, in response to determining that at least one track of the extent is awaiting staging into the cache from the space efficient target volume.

15. The storage controller of claim 1, the operations further comprising:

releasing the extent from the space efficient target volume in response to determining that no track of the extent is staging into the cache from the space efficient target volume, and that no track of the extent is awaiting staging into the cache from the space efficient target volume, and that no track of the extent is destaging from the cache to the space efficient target volume, and that no track of the extent is awaiting destaging from the cache to the space efficient target volume.

16. The computer program product of claim 7, the operations further comprising:

maintaining a target bitmap corresponding to the extent within the storage controller; and in response to determining that the extent is unallocated in the space efficient source volume, and that no track of the extent is staging into the cache from the space efficient target volume, and that no track of the extent is awaiting staging into the cache from the space efficient target volume, and that no track of the extent is destaging from the cache to the space efficient target volume, and that no track of the extent is awaiting destaging from the cache to the space efficient target volume performing:

setting the indicator in the target bitmap corresponding to the extent to indicate that any read for the extent from the space efficient target volume is not to be redirected to the space efficient source volume.

17. The computer program product of claim 7, the operations further comprising: determining whether any track of the extent is awaiting staging into the cache from the space efficient target; and avoiding releasing the extent from the space efficient target volume, in response to determining that at least one track of the extent is awaiting staging into the cache from the space efficient target volume.

18. The computer program product of claim 7, the operations further comprising:

releasing the extent from the space efficient target volume in response to determining that no track of the extent is staging into the cache from the space efficient target volume, and that no track of the extent is awaiting staging into the cache from the space efficient target volume, and that no track of the extent is destaging from the cache to the space efficient target volume, and that no track of the extent is awaiting destaging from the cache to the space efficient target volume.

\* \* \* \* \*